C. J. CARLSON AND A. W. LARSON.
ANIMAL TRAP.
APPLICATION FILED JUNE 12, 1919.
1,320,841. Patented Nov. 4, 1919.
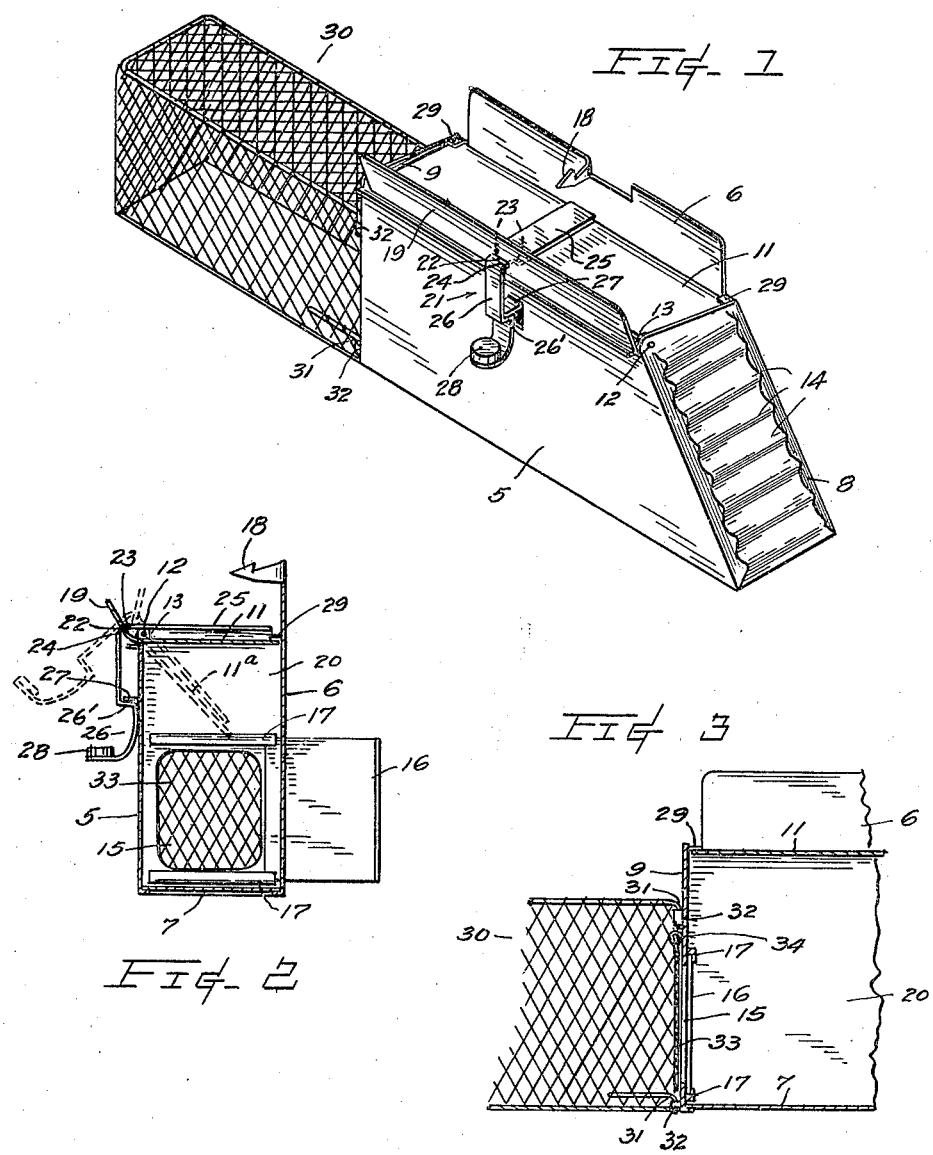
INVENTORS:
Charles J. Carlson
Albert W. Larson
BY
Pierre Barnes
ATTORNEY

UNITED STATES PATENT OFFICE.

CHARLES J. CARLSON AND ALBERT W. LARSON, OF SEATTLE, WASHINGTON.

ANIMAL-TRAP.

1,320,841.                Specification of Letters Patent.         Patented Nov. 4, 1919.

Application filed June 12, 1919. Serial No. 303,714.

*To all whom it may concern:*

Be it known that we, CHARLES J. CARLSON and ALBERT W. LARSON, citizens of the United States, residing at Seattle, in the county of King and State of Washington, have invented certain new and useful Improvements in Animal-Traps, of which the following is a specification.

This invention relates to animal traps and is intended, more especially, for catching small animals, such as rats and mice.

The object of our invention is the perfecting of traps of this character to afford one which will be of simple and inexpensive construction and which will be efficient and rapid in operation.

With these general ends in view, and other objects which will appear in the following description, the invention consists in the novel construction and combination of devices as will be hereinafter described, illustrated in the accompanying drawings; and particularly set forth in the appended claims.

In said drawings, Figure 1 is a perspective view of an animal trap embodying our invention. Fig. 2 is a transverse vertical sectional view thereof. Fig. 3 is a fragmentary longitudinal vertical section to illustrate, more particularly, the preferred manner of separably connecting the cage member to the trap proper.

In carrying out the invention, we provide a casing having side walls 5 and 6, a floor 7, and end walls 8 and 9 and a top wall constructed of a platform 11 which is hingedly connected adjacent to one side of the casing by a wire 12 extending through apertures provided in platform lugs 13 and in said end walls. The end wall 8 is desirably inclined and provided with corrugations or steps 14 to afford a convenient way or approach for the animals to ascend onto the platform.

The end wall 9, as shown, is provided with an exit or opening 15 which, upon occasion, is closed by a sliding door 16 passing through a slot in side wall 6 and between guide cleats 17.

The side wall 6 extends, as shown, above the plane of the platform when the latter is in its closed position and is formed at its top and at about its midlength with a finger 18 for supporting the bait. At its hinged side and above the wall 5, the platform is provided with an upwardly extending wall element 19 which serves with the upper portion of the wall 6 to direct an animal into the trap chamber 20 when the platform is tripped.

Associated with the platform is a lever catch 21 comprising a plate bent into a substantially bell-crank form which is fulcrumed in a slot 22 of platform wall 19 and between shoulders 23 and a bend 24 of the catch. One of the lever arms, as 25 extends transversely of the trap above the platform in proximity to the bait finger 18 and serves as the trigger element of the catch.

The other arm 26 of the catch extends downwardly and is provided with a hook $26^1$ which is engageable with a lug 27 protruding from the wall 5. Below such hook portion of the catch arm 26 is curved downwardly and laterally, as best shown in Fig. 2, and has connected to its outer extremity a heavy body 28 which serves with the weight of the element 19 to return the platform from its dotted line position, $11^a$ into its full line position Fig. 2, whereat the upward movement of the platform is arrested by its free end encountering stops 29 extending inwardly from the trap wall 6.

For the purpose of increasing the capacity of our trap, a removable extension is advantageously used, said extension being in the nature of a cage 30 which is, by preference, constructed of woven wire. This cage is adapted to be detachably connected to the trap proper by the provision of hooks 31 engageable within eye-attachments 32 secured to the casing end 9.

The adjacent end of the cage is provided with an inlet communicating with the trap outlet 15 and is closed against the return of animals by means of a gate 33 depending from a wire support 34 and arranged to swing into the cage.

When a mouse, or other animal, approaches the bait the animal will step upon and depress the trigger element of the catch thereby causing the hook $26^1$ to become disengaged from the lug 27, whereupon the platform is released and is borne down by the weight of the animal which is deposited in the subjacent chamber. After the platform has been relieved of the animal's weight, weight 28 asserts itself to return the platform to its horizontal position which is then secured by the hook reëngaging the lug 27.

What we claim, is—

1. An animal trap comprising a casing which is open at the top and having one of its side walls extended to a greater height than the other walls, a lug extending from the side of the casing, a bait-supporting finger extending above the opening from the top of such high wall, a platform for closing said opening and provided with an apertured wall element extending from its edge at the opposite side of the casing from the referred to casing wall, hinged connections between the platform and the casing, a bell-crank catch fulcrumed to the wall element of said platform by means of the aperture thereof, one of the arms of said catch extending over the platform and serving as a trigger element, the other arm having a hooked portion, and a heavy body carried by the last named arm and tending to retain the hooked portion of the catch in engagement with said lug and also serving to yieldingly retain the platform in its horizontal position.

2. An animal trap comprising a casing which is open at the top, a lug provided on one of the casing sides, a platform serving as a closure for the opening, said platform being hingedly connected adjacent to one of its edges to the ends of the casing, a bell-crank catch pivotally connected to said platform and having one of its arms provided with a hooked portion engageable with said lug, the other arm of the catch extending over the platform to serve as a trigger element whereby the weight of an animal applied thereto is capable of disengaging the catch from said lug to release the platform, and means acting through the medium of said catch whereby the latter is releasably connected to the lug and also serving to yieldingly retain the platform in its horizontal position.

Signed at Seattle, Washington, this 4th day of June, 1919.

CHARLES J. CARLSON.
ALBERT W. LARSON.

Witnesses:
PIERRE BARNES,
ELIZABETH JOHNSON.

Copies of this patent may be obtained for five cents each, by addressing the "Commissioner of Patents, Washington, D. C."